US012652565B2

(12) United States Patent
Hong

(10) Patent No.: US 12,652,565 B2
(45) Date of Patent: Jun. 9, 2026

(54) MEASUREMENT DATA PROCESSING METHOD AND APPARATUS, COMMUNICATION DEVICE, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 334 days.

(21) Appl. No.: 18/039,227

(22) PCT Filed: Nov. 30, 2020

(86) PCT No.: PCT/CN2020/132896
§ 371 (c)(1),
(2) Date: May 27, 2023

(87) PCT Pub. No.: WO2022/110195
PCT Pub. Date: Jun. 2, 2022

(65) Prior Publication Data
US 2023/0422069 A1 Dec. 28, 2023

(51) Int. Cl.
*H04W 24/10* (2009.01)
*H04W 56/00* (2009.01)

(52) U.S. Cl.
CPC ....... *H04W 24/10* (2013.01); *H04W 56/0095* (2013.01)

(58) Field of Classification Search
CPC .......................... H04W 24/10; H04W 56/0095
See application file for complete search history.

(56) References Cited

U.S. PATENT DOCUMENTS

| | | | |
|---|---|---|---|
| 2016/0302165 A1 | 10/2016 | Da et al. | |
| 2017/0230854 A1* | 8/2017 | Harada | H04W 48/16 |
| 2018/0007577 A1* | 1/2018 | Guo | H04W 16/28 |
| 2019/0098562 A1* | 3/2019 | Ng | H04L 25/0224 |
| 2023/0007521 A1* | 1/2023 | Takahashi | H04W 16/28 |

(Continued)

FOREIGN PATENT DOCUMENTS

CN          114071533 A          2/2022

OTHER PUBLICATIONS

First Office Action issued to Chinese Application No. 202080003795.5 dated Jun. 22, 2022 with English translation, (17p).

(Continued)

*Primary Examiner* — Deepa Belur
(74) *Attorney, Agent, or Firm* — Arch & Lake LLP; Hao Tan; Shen Wang

(57) ABSTRACT

A measurement data processing method and apparatus, a communication device, and a storage medium are provided. In the measurement data processing method, a base station determines a timing difference between synchronization timing of a synchronization reference cell and synchronization timing of a neighboring cell when a user equipment (UE) performs channel state information reference signal (CSI-RS) measurement; and according to the timing difference, a measurement precision requirement parameter corresponding to a CSI-RS measurement result obtained by the UE performing the CSI-RS measurement is determined.

16 Claims, 4 Drawing Sheets

(56)                    References Cited

U.S. PATENT DOCUMENTS

| | | | |
|---|---|---|---|
| 2023/0269682 A1* | 8/2023 | Du | H04L 5/0051 |
| | | | 370/252 |
| 2023/0284061 A1* | 9/2023 | Chen | H04W 24/10 |
| | | | 370/329 |
| 2024/0140293 A1* | 5/2024 | Sandler | B60P 1/286 |
| 2025/0081016 A1* | 3/2025 | Abedini | H04W 48/14 |

OTHER PUBLICATIONS

Qualcomm CDMA Technologies, Simulation results on CSI-RS based L3 measurements for RSRP, 3GPP TSG-RAN WG4 Meeting #97-3 Electronic Meeting, Nov. 2-13, 2020, R4-2014354, (3p).

CATT, "CR on performance requirement for CSI-RSRQ L3 measurement", 3GPP TSG-RAN4 Meeting #97-e, Electronic Meeting, Nov. 2-13, 2020, R4-2017348, (8p).

OPPO, "WF on CSI-RS based L3 measurement capability and requirements" 3GPP TSG-RAN4 Meeting #95e, Electronic Meeting, May 25-Jun. 5, 2020, R4-2009009, (8p).

Mediatek, Inc., "Synchronization assumption for CSI-RS RRM", 3GPP TSG-RAN WG4 Meeting #95-e, Electronic Meeting, May 25-Jun. 5, 2020, R4-2006576, (3p).

3GPP TS 38.133 v18.1.0 (Mar. 2023) Technical Specification, 3rd Generation Partnership Project; Technical Specification Group Radio Access Network; NR; Requirements for support of radio resource management (Release 18), (5,362p).

\* cited by examiner information transmission apparatus 200 sending module 210 sending sub-module 211

MEASUREMENT DATA PROCESSING METHOD AND APPARATUS, COMMUNICATION DEVICE, AND STORAGE MEDIUM

CROSS REFERENCE

The present application is the U.S. National Stage of International Application No. PCT/CN2020/132896, filed on Nov. 30, 2020, the contents of which are incorporated herein by reference in their entireties for all purposes.

TECHNICAL FIELD

The present application relates to the field of wireless communication technology but is not limited to this, and in particular to a measurement data processing method and apparatus, a communication device and a storage medium.

BACKGROUND

In the 3GPP (The 3rd Generation Partnership Project) protocol TS38.133, the requirement for intra-frequency measurement and inter-frequency measurement of the Channel State Information-Reference Signal (CSI-RS) is introduced for wireless signal measurements After receiving the CSI-RS measurement results reported by the UE, the base station will evaluate the CSI-RS measurement results based on the measurement precision requirement parameter. If the UE only supports single-band fast FFT (single FFT), when the synchronization timing difference between the synchronization reference cell and the target neighboring cell exceeds a certain limit, since the UE can only measure based on the synchronization timing of the synchronization reference cell, the CSI-RS measurement result of the UE for the target cell may be attenuated due to the timing difference, and there is a probability that it will be determined as unreliable.

SUMMARY

The present disclosure provides a measurement data processing method and apparatus, a communication device and a storage medium.

According to a first aspect of the present disclosure, there is provided a measurement data processing method, applied to a base station, the method including:

determining a timing difference between synchronization timing of a synchronization reference cell and synchronization timing of a neighboring cell in response to determining that a user equipment (UE) performs channel state information reference signal (CSI-RS) measurement; and determining a measurement precision requirement parameter corresponding to a CSI-RS measurement result obtained by the UE performing the CSI-RS measurement according to the timing difference.

According to a second aspect of the present disclosure, there is provided an information transmission method, applied to a UE, the method including:

sending a measurement report carrying timing difference indication information, where the timing difference indication information is used to indicate a timing difference between synchronization timing of a synchronization reference cell and synchronization timing of a neighboring cell in response to determining that the UE performs channel state information reference signal (CSI-RS) measurement, such that a receiving end determines a measurement precision requirement parameter corresponding to a CSI-RS measurement result obtained by the UE performing the CSI-RS measurement according to the timing difference.

According to a third aspect of the present disclosure, there is provided a measurement data processing apparatus, applied to a base station, the apparatus including: a first determination module and a second determination module, where the first determination module is configured to determine a timing difference between synchronization timing of a synchronization reference cell and synchronization timing of a neighboring cell in response to that a user equipment (UE) performs channel state information reference signal (CSI-RS) measurement; and the second determination module is configured to determine a measurement precision requirement parameter corresponding to a CSI-RS measurement result obtained by the UE performing the CSI-RS measurement according to the timing difference.

According to a fourth aspect of the present disclosure, there is provided an information transmission apparatus, applied to a UE, the apparatus including: a sending module, where the sending module is configured to send a measurement report carrying timing difference indication information, where the timing difference indication information is used to indicate a timing difference between synchronization timing of a synchronization reference cell and synchronization timing of a neighboring cell in response to determining that the UE performs channel state information reference signal (CSI-RS) measurement, such that a receiving end determines a measurement precision requirement parameter corresponding to a CSI-RS measurement result obtained by the UE performing the CSI-RS measurement according to the timing difference.

According to a fifth aspect of the present disclosure, there is provided a communication device, including a processor, a memory and an executable program stored on the memory and capable of being run by the processor, where the processor performs the measurement data processing method according to the first aspect, or the information transmission method according to the second aspect, when running the executable program.

According to a sixth aspect of the present disclosure, there is provided a non-transitory storage medium, with an executable program stored thereon, where the executable program implements the measurement data processing method according to the first aspect, or the information transmission method according to the second aspect, when executed by a processor.

It should be understood that the above general description and the following detailed description are only exemplary and explanatory and do not limit the present disclosure.

BRIEF DESCRIPTION OF THE DRAWINGS

The accompanying drawings herein are incorporated into and form part of the specification, illustrate embodiments in accordance with the present disclosure and are used in conjunction with the specification to explain the principles of embodiments of the disclosure.

DETAILED DESCRIPTION

Example embodiments will be described herein in detail, examples of which are represented in the accompanying drawings. Where the following description relates to the accompanying drawings, the same numerals in the different accompanying drawings indicate the same or similar elements, unless otherwise indicated. The implementations described in the following example embodiments do not represent all implementations consistent with embodiments of the present disclosure. Rather, they are only examples of apparatuses and methods that are consistent with some aspects of embodiments of the present disclosure as detailed in the appended claims.

The terms used in embodiments of this disclosure is for the purpose of describing particular embodiments only and is not intended to limit embodiments of the present disclosure. The singular forms of "a," "said" and "the" as used in embodiments of this disclosure and the appended claims are also intended to include plural forms, unless the context clearly indicates other meanings. It should also be understood that the term "and/or" as used herein refers to and encompasses any or all possible combinations of one or more of the associated listed items.

It should be understood that while the terms first, second, third, etc. may be used in embodiments of this disclosure to describe various information, such information should not be limited to these terms. These terms are used only to distinguish information of the same type from one another. For example, without departing from the scope of embodiments of the present disclosure, first information may also be referred to as second information, and similarly, second information may also be referred to as first information. Depending on the context, for example, the word "if" as used here may be interpreted as "at . . . " or "when . . . " or "in response to determining."

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Figure 1:
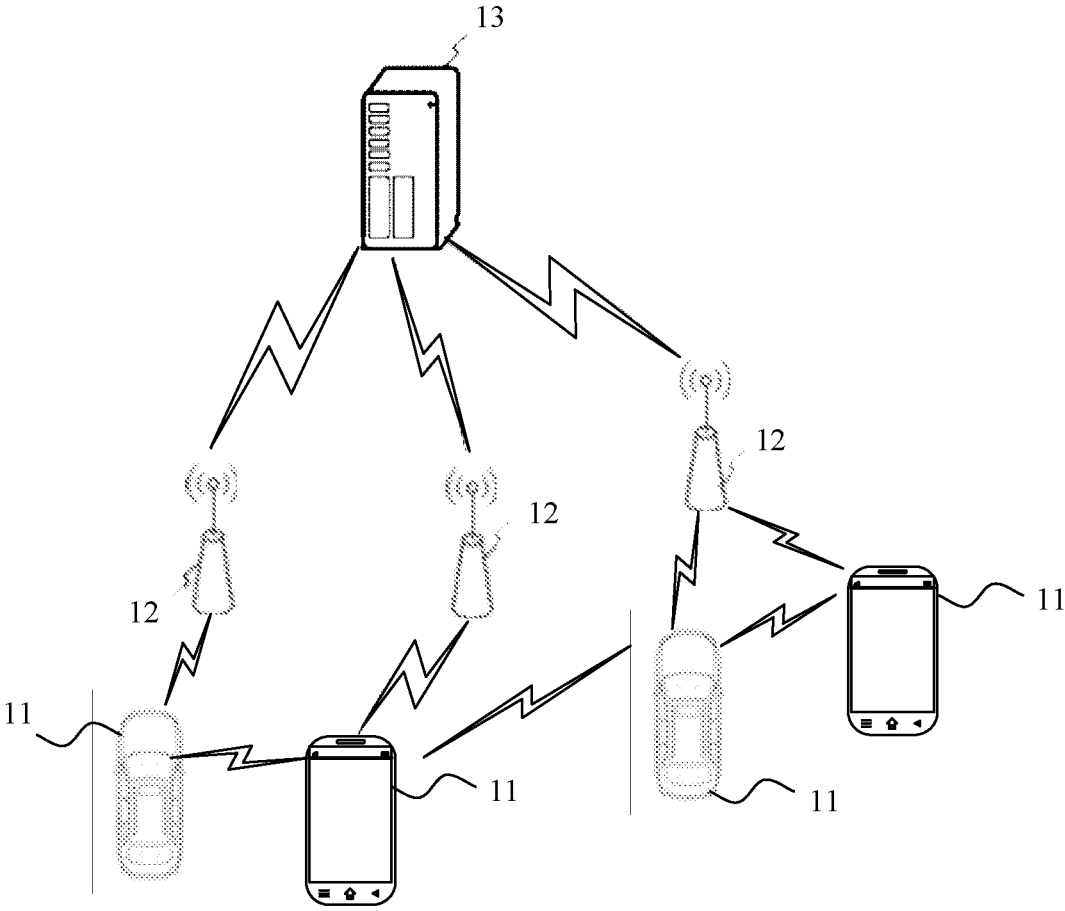
FIG. 1 is a schematic diagram of the structure of a wireless communication system illustrated according to an example embodiment.

Reference is made to FIG. 1, which illustrates a schematic diagram of the structure of a wireless communication system provided by embodiments of the present disclosure. As shown in FIG. 1, the wireless communication system is a communication system based on cellular mobile communication technology, and the wireless communication system may include: a plurality of terminals 11 and a plurality of base stations 12.

The terminal 11 may be a device providing voice and/or data connectivity to a user. The terminal 11 may communicate with one or more core networks via a Radio Access Network (RAN). The terminal 11 may be an IoT terminal, such as a sensor device, a mobile phone (or "cellular" phone) and a computer with an IoT terminal, for example, it may be a fixed, portable, pocket-sized, handheld, computer-built or vehicle-mounted device. For example, a station (STA), subscriber unit, subscriber station, mobile station, mobile, remote station, access point, remote terminal, access terminal, user terminal, user agent, user device, or user equipment (UE). Alternatively, the terminal 11 may also be a device of an unmanned aerial vehicle. Alternatively, the terminal 11 may also be an in-vehicle device, for example, a trip computer with wireless communication functions, or a wireless communication device externally connected to the trip computer. Alternatively, terminal 11 may also be a roadside device, for example, it may be a street lamp, signal lamp or other roadside devices with wireless communication functions, etc.

The base station 12 may be a network side device in a wireless communication system. The wireless communication system may be the fourth generation mobile communication (4G) system, also known as a Long Term Evolution (LTE) system. Alternatively, the wireless communication system may also be a 5G system, also known as a new radio (NR) or 5G NR system. Alternatively, the wireless communication system may also be a further next generation system of the 5G system. The access network in the 5G system may be called NG-RAN (New Generation-Radio Access Network), or an MTC system.

The base station 12 may be an evolved base station (eNB) as employed in the 4G system. Alternatively, the base station 12 may also be a base station (gNB) employing a centralized distributed architecture in the 5G system. When the base station 12 uses the centralized distributed architecture, it typically includes a central unit (CU) and at least two distributed units (DU). The central unit is provided with a protocol stack of a Packet Data Convergence Protocol (PDCP) layer, a Radio Link Control (RLC) layer, and a Media Access Control (MAC) layer. The distributed unit is provided with a physical (PHY) layer protocol stack. The specific implementation of the base station 12 is not limited in embodiments of the disclosure.

A wireless connection can be established between the base station 12 and the terminal 11 via a wireless air interface. In different embodiments, the wireless air interface is a wireless air interface based on the fourth generation mobile communication network technology (4G) standard. Alternatively, the wireless air interface is a wireless air interface based on the fifth generation mobile communication network technology (5G) standard, for example, the wireless air interface is a new air interface. Alternatively, the wireless air interface may also be a wireless air interface based on the further next generation mobile communication network technology standard of 5G.

In some embodiments, the E2E (End to End) connection can also be established between terminals 11, for example, V2V (vehicle to vehicle) communication, V2I (vehicle to infrastructure) communication and V2P (vehicle to pedestrian) communication in vehicle to everything (V2X) communication.

In some embodiments, the above wireless communication system may also include a network management device 13.

A number of base stations 12 are connected to the network management device 13 respectively. The network management device 13 may be a core network device in the wireless communication system. For example, the network management device 13 may be a Mobility Management Entity (MME) in an Evolved Packet Core (EPC). Alternatively, the network management device may also be another core network device, such as a Serving GateWay (SGW), Public Data Network GateWay (PGW), Policy and Charging Rules Function (PCRF), or Home Subscriber Server (HSS), etc. The form of implementation of the network management device 13 is not limited by embodiments of the present disclosure.

The implementation subjects involved in embodiments of the present disclosure include, but are not limited to, UEs such as mobile phone terminals supporting cellular mobile communication, and base stations, etc.

One application scenario of embodiments of the present disclosure is that the current protocol TS38.133 only defines a set of SSB-based measurement precision requirement parameters. In some embodiments, the measurement precision requirement parameters may be used to evaluate the precision of the CSI-RS measurement results obtained from the UE measurements. For example, the evaluation result may be reliable or unreliable. For example, the measurement precision requirement of the base station is 20 dB, and if the difference between the reported CSI-RS measurement result precision and the measurement precision requirement 20 dB goes beyond the deviation range, it is determined that the CSI-RS measurement result is unreliable.

There is only one set of measurement precision requirement parameters in the relevant technology, which leads to inaccurate evaluation results for the precision of the CSI-RS measurement results.

Figure 2:
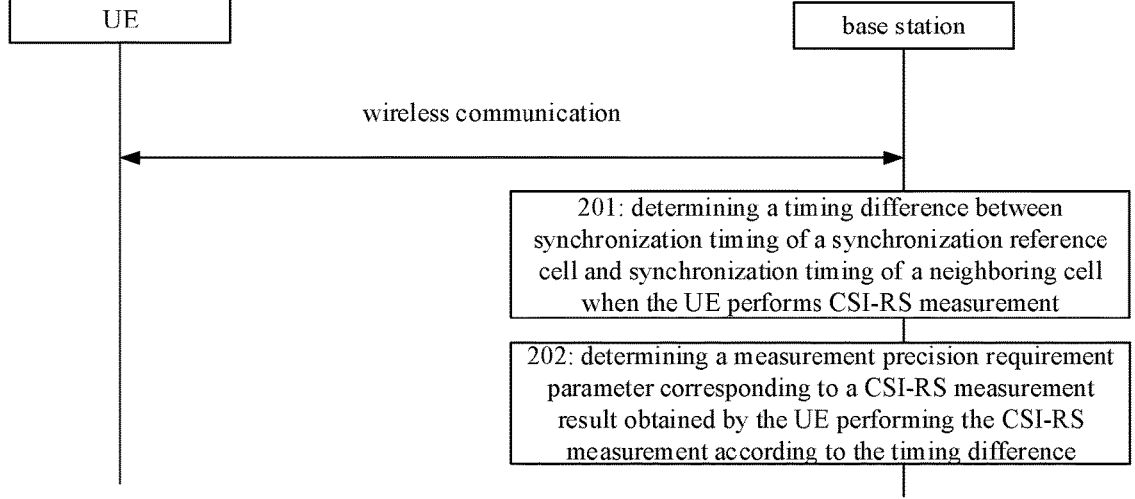
FIG. 2 is a flowchart of a measurement data processing method according to an example embodiment.

As shown in FIG. 2, this example embodiment provides a measurement data processing method. The measurement data processing method may be applied in a base station of a cellular mobile communication system and includes:

step 201, determining a timing difference between synchronization timing of a synchronization reference cell and synchronization timing of a neighboring cell in response to that a user equipment (UE) performs channel state information reference signal (CSI-RS) measurement; and step 202, determining a measurement precision requirement parameter corresponding to a CSI-RS measurement result obtained by the UE performing the CSI-RS measurement according to the timing difference.

Herein, the UE may be, for example, a mobile phone terminal employing cellular mobile communication technology for wireless communication. The base station may be a communication device that provides an access network interface to the UE in a cellular mobile communication system.

CSI-RS can be used for channel quality estimation of downlink signals when mobility management is performed by the UE. The CSI-RS measurement result can be used for cell selection/reselection for idle-state UEs, or cell switching for connected-state UEs, etc. For example, for an idle-state UE, the reference signal receiving power (RSRP)/reference signal receiving quality (RSRQ) of the CSI-RS signal can be measured, and the S criterion can be used for cell selection, or the R criterion can be used for cell reselection.

The UE realizes synchronization with the synchronization reference cell or the neighboring cell based on the synchronization timing, and receives the signal of the synchronization reference cell or the neighboring cell for measurement. The UE can perform the measurement of CSI-RS in the timing window. Herein, the neighboring cell may be the target cell for switch of the UE.

The UE typically performs the CSI-RS measurement based on the synchronization timing of the synchronization reference cell. The synchronization timing of the synchronization reference cell and the synchronization timing of the neighboring cell are not necessarily consistent, and there may be a timing difference. When the UE measures the CSI-RS of the synchronous reference cell and the neighboring cell based on the synchronous timing of the synchronous reference cell, the CSI-RS of the neighboring cell measured by the UE in the synchronous window of the synchronous reference cell will be attenuated relative to the actual CSI-RS signal of the neighboring cell due to the timing difference. Therefore, the CSI-RS measurement results obtained when the CSI-RS measurement of the neighboring cell is performed based on the synchronization timing of the synchronization reference cell may be biased. If the same set of measurement precision requirement parameters is used to evaluate the CSI-RS signal quality of the CSI-RS measurement results, the evaluation results will be inaccurate, and then the reliability of the measurement results reported by UE will decrease.

Here, the measurement precision requirement parameters corresponding to the timing difference may be: setting different measurement precision requirement parameters for different timing differences, or dividing the timing difference into a plurality of timing difference ranges, and setting different measurement precision requirement parameters for different timing difference ranges. Different measurement precision requirement parameters can be set based on signal attenuation caused by different timing differences, which can be used to accurately evaluate CSI-RS measurement results obtained under uncertain timing differences.

The base station can determine the timing difference based on the report information of the UE.

After performing the CSI-RS measurement, the UE can send the CSI-RS measurement results of the synchronous reference cell and/or the neighboring cell to the base station. The base station can determine a set of measurement precision requirement parameters corresponding to the reported timing difference based on the timing difference or the timing difference range where the timing difference is located, and evaluate the reported CSI-RS measurement results by adopting the determined measurement precision requirement parameters.

In this way, the measurement precision requirement parameter corresponding to the timing difference is determined, and different measurement precision requirement parameters can be determined for different timing differences. On the one hand, this increases the flexibility in the selection of the measurement precision requirement parameters. On the other hand, the measurement precision requirement parameter corresponding to the timing difference can be used for evaluation when evaluating the measurement results, which improves the evaluation accuracy of the CSI-RS measurement results and thus improves the reliability of the CSI-RS measurement results.

In the embodiment of the present disclosure, the base station can determine at least two measurement precision requirement parameters, referred to as the first measurement precision requirement parameter and the second measurement precision requirement parameter in the embodiment of the present disclosure. The first measurement precision requirement parameter is different from the second measurement precision requirement parameter. In an embodiment of the present disclosure, the first measurement precision requirement parameter being different from the second measurement precision requirement parameter means that the first measurement precision requirement parameter is completely different from the second measurement precision requirement parameter, or the first measurement precision requirement parameter is not completely identical to the second measurement precision requirement parameter (i.e., partially identical and partially different). In an embodiment of the present disclosure, the first measurement precision requirement parameter may include one or more parameters and the second measurement precision requirement parameter may include one or more parameters.

In an embodiment, said determining a measurement precision requirement parameter corresponding to a CSI-RS measurement result obtained by the UE performing the CSI-RS measurement according to the timing difference includes:

in response to determining that the timing difference is greater than a timing difference threshold, the measurement precision requirement parameter corresponding to the CSI-RS measurement result is a first measurement precision requirement parameter;

or, in response to determining that the timing difference is smaller than or equal to the timing difference threshold, the measurement precision requirement parameter corresponding to the CSI-RS measurement result is a second measurement precision requirement parameter, wherein the first measurement precision requirement parameter is different from the second measurement precision requirement parameter. In an embodiment of the present disclosure, the first measurement precision requirement parameter being different from the second measurement precision requirement parameter means that the first measurement precision requirement parameter is completely different from the second measurement precision requirement parameter, or the first measurement precision requirement parameter is not completely identical to the second measurement precision requirement parameter (i.e., partially identical and partially different). In an embodiment of the present disclosure, the first measurement precision requirement parameter may include one or more parameters and the second measurement precision requirement parameter may include one or more parameters.

Here, a timing difference threshold can be set and a corresponding measurement precision requirement parameter can be determined based on the timing difference threshold. In some embodiments, the base station can determine two measurement precision requirement parameters, for example, a first measurement precision requirement parameter can be used for CSI-RS measurement results measured within the timing difference threshold, and a second measurement precision requirement parameter can be used for CSI-RS measurement results measured outside the timing difference threshold.

The timing difference threshold may be determined based on the signal attenuation of the neighboring cell when the UE makes measurements at different timing differences.

According to different signal attenuation situations, different measurement precision requirement parameters are adopted. In this way, the evaluation accuracy of CSI-RS measurement results can be improved, and then the reliability of CSI-RS measurement results can be improved.

In one embodiment, the method further includes:

receiving a measurement report carrying timing difference indication information;

determining the timing difference according to the timing difference indication information.

After completing the measurement of CSI-RS of the synchronous reference cell and the neighboring cell, the UE can send the CSI-RS measurement results to the base station. The measurement results can be carried in the measurement report.

The timing difference indicated by the timing difference indication information may be a specific value of the timing difference, a range of the timing difference, or an indication of whether the timing difference is greater than a difference threshold.

For example, the UE may determine whether the timing difference between the synchronization timing of a synchronization reference cell and the synchronization timing of a neighboring cell is greater than a timing difference threshold. Indication information indicating whether the timing difference is greater than the timing difference threshold is carried in the measurement report.

The indication information can occupy 1 bit. For example, "1" may be used to indicate that the timing difference is greater than the timing difference threshold, and "0" may be used to indicate that the timing difference is smaller than or equal to the timing difference threshold. Also, "0" may be used to indicate that the timing difference is greater than the timing difference threshold, and "1" may be used to indicate that the timing difference is smaller than or equal to the timing difference threshold. The indication information can be carried by the reserved bits in the measurement report, which improves the information amount carried by the measurement report and improves the utilization rate of the measurement report. The bit carrying indication information can also be newly defined in the measurement report.

In an embodiment, said receiving a measurement report carrying timing difference indication information includes:

receiving the measurement report carrying the timing difference indication information in a measurement results MeasResults information element.

The indication information can be sent to the base station by the UE by being carried in the MeasResults information element in the measurement report. The indication information can be carried by the reserved bits in the MeasResults information element, which improves the information amount carried by the MeasResults information element and improves the utilization rate of the MeasResults information element. The bit carrying indication information can also be newly defined in the MeasResults information element.

In an embodiment, the method further includes:

evaluating the CSI-RS measurement result of the UE according to the determined measurement precision parameter.

Here, the CSI-RS measurement results of the UE can be evaluated based on the determined measurement precision parameter.

Since the measurement precision parameter is determined based on the timing difference, different measurement precision requirement parameters can be set based on signal attenuation caused by different timing differences, which can be used to accurately evaluate CSI-RS measurement results obtained under uncertain timing differences.

Therefore, the measurement precision parameters can accurately evaluate the measurement results and improve the reliability of CSI-RS measurement results.

In an embodiment, said evaluating the CSI-RS measurement result of the UE according to the determined measurement precision parameter includes:

evaluating the CSI-RS measurement result carried in the MeasResults information element of the received measurement report according to the determined measurement precision parameter.

After completing the measurement of CSI-RS of the synchronous reference cell and the neighboring cell, the UE can send the CSI-RS measurement results to the base station. The measurement results can be carried in the MeasResults information element of the measurement report.

In an embodiment, the CSI-RS measurement result includes: a CSI-RS measurement result of the synchronous reference cell and/or a CSI-RS measurement result of the neighboring cell.

The CSI-RS measurement result carried in the MeasResults information element may include a CSI-RS measurement result of the synchronous reference cell and/or a CSI-RS measurement result of the neighboring cell.

The base station can determine whether the timing difference is greater than the MeasResults information element according to the indication information in the MeasResults information element, select the measurement precision requirement parameter based on whether the timing difference is greater than the MeasResults information element, and evaluate the CSI-RS measurement result of the synchronous reference cell and/or the CSI-RS measurement result of the neighboring cell by using the selected measurement precision requirement parameter.

In this way, the CSI-RS measurement results can be evaluated by using the measurement precision requirement parameters corresponding to the timing difference, and different measurement precision requirement parameters can be used for evaluation with respect to the changes of the measurement results caused by the timing difference, so as to improve the evaluation accuracy of the CSI-RS measurement results and further improve the reliability of the CSI-RS measurement results.

Figure 3:
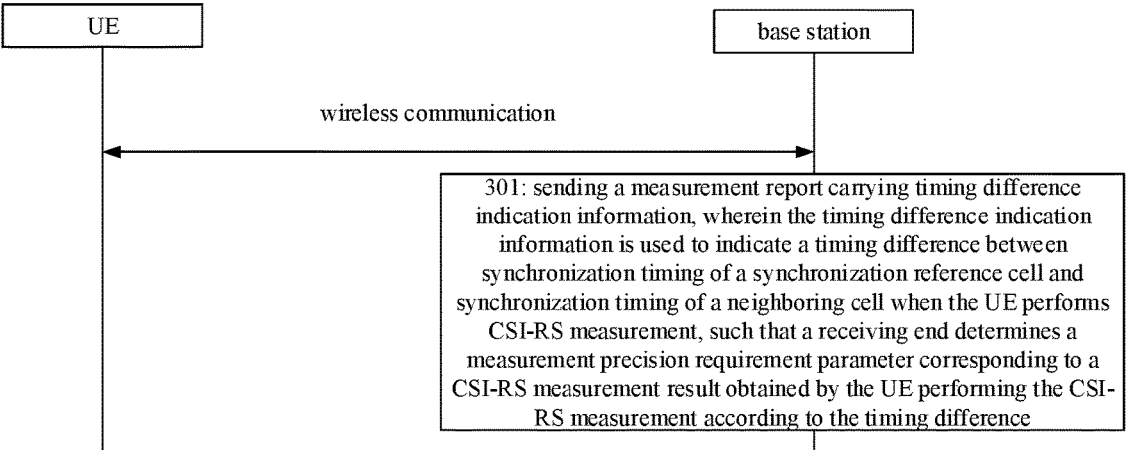
FIG. 3 is a flowchart of an information transmission method according to an example embodiment.

As shown in FIG. 3, this example embodiment provides an information transmission method. The information transmission method may be applied in a UE of a cellular mobile communication system and includes:

step 301: sending a measurement report carrying timing difference indication information, wherein the timing difference indication information is used to indicate a timing difference between synchronization timing of a synchronization reference cell and synchronization timing of a neighboring cell in response to that the UE performs channel state information reference signal (CSI-RS) measurement, such that a receiving end determines a measurement precision requirement parameter corresponding to a CSI-RS measurement result obtained by the UE performing the CSI-RS measurement according to the timing difference.

Herein, the UE may be, for example, a mobile phone terminal employing cellular mobile communication technology for wireless communication. A receiving end such as a base station may be a communication device that provides an access network interface to the UE in a cellular mobile communication system.

CSI-RS can be used for channel quality estimation of downlink signals when mobility management is performed by the UE. The CSI-RS measurement result can be used for cell selection/reselection for idle-state UEs, or cell switching for connected-state UEs, etc. For example, for an idle-state UE, the reference signal receiving power (RSRP)/reference signal receiving quality (RSRQ) of the CSI-RS signal can be measured, and the S criterion can be used for cell selection, or the R criterion can be used for cell reselection.

The UE realizes synchronization with the synchronization reference cell or the neighboring cell based on the synchronization timing, and receives the signal of the synchronization reference cell or the neighboring cell for measurement. The UE can perform the measurement of CSI-RS in the timing window. Herein, the neighboring cell may be the target cell for switch of the UE.

The UE typically performs the CSI-RS measurement based on the synchronization timing of the synchronization reference cell. The synchronization timing of the synchronization reference cell and the synchronization timing of the neighboring cell are not necessarily consistent, and there may be a timing difference. When the UE measures the CSI-RS of the synchronous reference cell and the neighboring cell based on the synchronous timing of the synchronous reference cell, the CSI-RS of the neighboring cell measured by the UE in the synchronous window of the synchronous reference cell will be attenuated relative to the actual CSI-RS signal of the neighboring cell due to the timing difference. Therefore, the CSI-RS measurement results obtained when the CSI-RS measurement of the neighboring cell is performed based on the synchronization timing of the synchronization reference cell may be biased. If the same set of measurement precision requirement parameters is used to evaluate the CSI-RS signal quality of the CSI-RS measurement results, the evaluation results will be inaccurate, and then the reliability of the measurement results reported by UE will decrease.

Here, the measurement precision requirement parameters corresponding to the timing difference may be: setting different measurement precision requirement parameters for different timing differences, or dividing the timing difference into a plurality of timing difference ranges, and setting different measurement precision requirement parameters for different timing difference ranges. Different measurement precision requirement parameters can be set based on signal attenuation caused by different timing differences, which can be used to accurately evaluate CSI-RS measurement results obtained under uncertain timing differences.

The base station can determine the timing difference based on the report information of the UE.

After performing the CSI-RS measurement, the UE can send the CSI-RS measurement results of the synchronous reference cell and/or the neighboring cell to the base station. The base station can determine a set of measurement precision requirement parameters corresponding to the reported timing difference based on the timing difference or the timing difference range where the timing difference is located, and evaluate the reported CSI-RS measurement results by adopting the determined measurement precision requirement parameters.

Here, a timing difference threshold can be set, a first measurement precision requirement parameter can be used for evaluating CSI-RS measurement results measured within the timing difference threshold, and a second measurement precision requirement parameter can be used for evaluating CSI-RS measurement results measured outside the timing difference threshold.

In the embodiment of the present disclosure, the base station can determine at least two measurement precision requirement parameters, referred to as the first measurement precision requirement parameter and the second measurement precision requirement parameter in the embodiment of the present disclosure. The first measurement precision requirement parameter is different from the second measurement precision requirement parameter. In an embodiment of the present disclosure, the first measurement precision requirement parameter being different from the second measurement precision requirement parameter means that the first measurement precision requirement parameter is completely different from the second measurement precision requirement parameter, or the first measurement precision requirement parameter is not completely identical to the second measurement precision requirement parameter (i.e., partially identical and partially different). In an embodiment of the present disclosure, the first measurement precision requirement parameter may include one or more parameters and the second measurement precision requirement parameter may include one or more parameters.

The timing difference threshold may be determined based on the signal attenuation of the neighboring cell when the UE makes measurements at different timing differences. According to different signal attenuation situations, different measurement precision requirement parameters are adopted. In this way, the evaluation accuracy of CSI-RS measurement results can be improved, and then the reliability of CSI-RS measurement results can be improved.

After completing the measurement of CSI-RS of the synchronous reference cell and the neighboring cell, the UE can send the CSI-RS measurement results to the base station. The measurement results can be carried in the measurement report. The timing difference indicated by the timing difference indication information may be a specific value of the timing difference, a range of the timing difference, or an indication of whether the timing difference is greater than a difference threshold.

For example, the UE may determine whether the timing difference between the synchronization timing of a synchronization reference cell and the synchronization timing of a neighboring cell is greater than a timing difference threshold. Indication information indicating whether the timing difference is greater than the timing difference threshold is carried in the measurement report.

The indication information can occupy 1 bit. For example, "1" may be used to indicate that the timing difference is greater than the timing difference threshold, and "0" may be used to indicate that the timing difference is smaller than or equal to the timing difference threshold. Also, "0" may be used to indicate that the timing difference is greater than the timing difference threshold, and "1" may be used to indicate that the timing difference is smaller than or equal to the timing difference threshold. The indication information can be carried by the reserved bits in the measurement report, which improves the information amount carried by the measurement report and improves the utilization rate of the measurement report. The bit carrying indication information can also be newly defined in the measurement report.

In this way, the measurement precision requirement parameter corresponding to the timing difference is determined, and different measurement precision requirement parameters can be determined for different timing differences. On the one hand, this increases the flexibility in the selection of the measurement precision requirement parameters. On the other hand, the measurement precision requirement parameter corresponding to the timing difference can be used for evaluation when evaluating the measurement results, which improves the evaluation accuracy of the CSI-RS measurement results and thus improves the reliability of the CSI-RS measurement results.

In an embodiment, said sending a measurement report carrying timing difference indication information includes:

sending the measurement report carrying the timing difference indication information in a measurement result MeasResults information element.

The indication information can be sent to the base station by the UE by being carried in the MeasResults information element in the measurement report. The indication information can be carried by the reserved bits in the MeasResults information element, which improves the information amount carried by the MeasResults information element and improves the utilization rate of the MeasResults information element. The bit carrying indication information can also be newly defined in the MeasResults information element.

In an embodiment, the MeasResults information element further carries a CSI-RS measurement result obtained by the UE performing the CSI-RS measurement.

After completing the measurement of CSI-RS of the synchronous reference cell and the neighboring cell, the UE can send the CSI-RS measurement results to the base station. The measurement results can be carried in the MeasResults information element of the measurement report.

In an embodiment, the CSI-RS measurement result includes: a CSI-RS measurement result of the synchronous reference cell and/or a CSI-RS measurement result of the neighboring cell.

The CSI-RS measurement result carried in the MeasResults information element may include a CSI-RS measurement result of the synchronous reference cell and/or a CSI-RS measurement result of the neighboring cell.

The base station can determine whether the timing difference is greater than the MeasResults information element according to the indication information in the MeasResults information element, select the measurement precision requirement parameter based on whether the timing difference is greater than the MeasResults information element, and evaluate the CSI-RS measurement result of the synchronous reference cell and/or the CSI-RS measurement result of the neighboring cell by using the selected measurement precision requirement parameter.

In this way, the CSI-RS measurement results can be evaluated by using the measurement precision requirement parameters corresponding to the timing difference, and different measurement precision requirement parameters can be used for evaluation with respect to the changes of the measurement results caused by the timing difference, so as to improve the evaluation accuracy of the CSI-RS measurement results and further improve the reliability of the CSI-RS measurement results.

A specific example is provided below in connection with any of the above embodiments.

The CSI-RS measurement evaluation method provided in this example includes following steps.

Step 1: When the UE executes the mobility measurement based on CSI-RS, the timing difference between the synchronization reference cell and the neighboring cell can be calculated by measuring the synchronization timing of the two cells, and the indication information of whether the timing difference between the measurement target cell and the synchronization reference cell exceeds the defined threshold value is introduced into the signaling MeasResults.

Step 2: When the timing difference value between the two cells exceeds the threshold value H, the indication information is TURE, otherwise it is FALSE. Here, the timing difference value ΔT can be expressed by the following expression:

$$\Delta T = |T_1 - T_2|$$

wherein, $T_1$ represents the synchronization timing of the synchronization reference cell, and $T_2$ represents the synchronization timing of the neighboring cell.

Step 3: the serving base station determines to use which set of CSI-RS measurement precision requirement to evaluate the reported measurement results through the reported indication information.

Figures 4, 5:
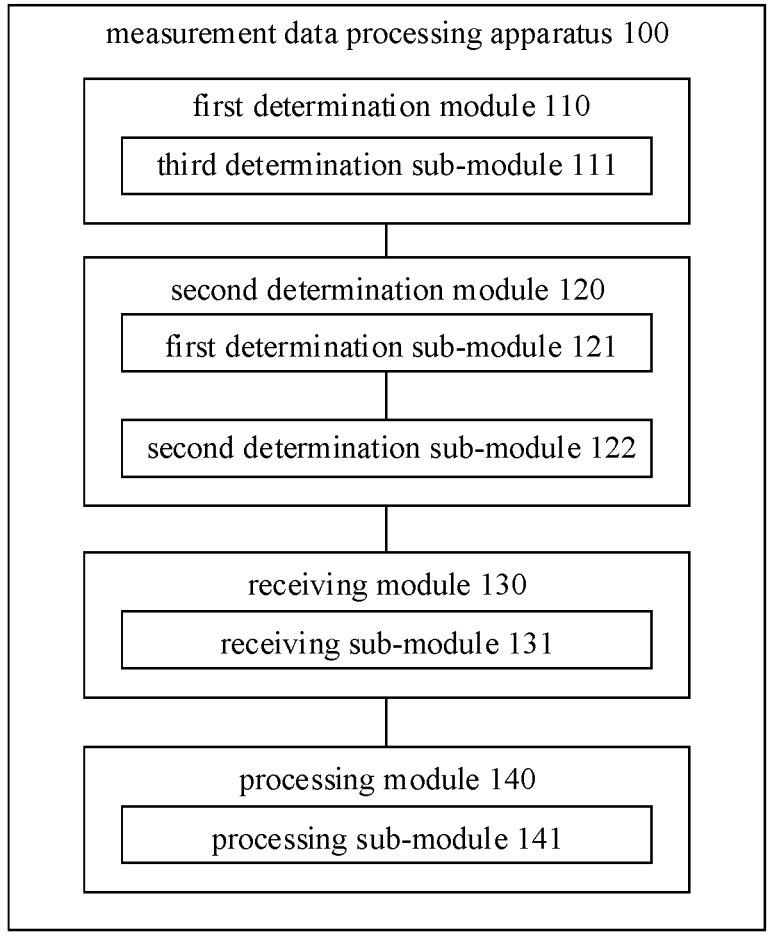
FIG. 4 is a block diagram of a measurement data processing apparatus according to an example embodiment.
FIG. 5 is a block diagram of another information transmission apparatus according to an example embodiment.

Embodiments of the present invention also provide a measurement data processing apparatus, applied to a base station for wireless communication. As shown in FIG. 4, the measurement data processing apparatus 100 includes: a first determination module 110 and a second determination module 120, wherein the first determination module 110 is configured to determine a timing difference between synchronization timing of a synchronization reference cell and synchronization timing of a neighboring cell in response to that a user equipment (UE) performs channel state information reference signal (CSI-RS) measurement; and the second determination module 120 is configured to determine a measurement precision requirement parameter corresponding to a CSI-RS measurement result obtained by the UE performing the CSI-RS measurement according to the timing difference.

In an embodiment, the second determination module 120 includes:

a first determination sub-module 121, configured to, in response to that the timing difference is greater than a timing difference threshold, the measurement precision requirement parameter corresponding to the CSI-RS measurement result is a first measurement precision requirement parameter;

or, a second determination sub-module 122, configured to, in response to that the timing difference is smaller than or equal to the timing difference threshold, the measurement precision requirement parameter corresponding to the CSI-RS measurement result is a second measurement precision requirement parameter, wherein the first measurement precision requirement parameter is different from said second measurement precision requirement parameter.

In an embodiment, the apparatus further includes:

a receiving module 130 configured to receive a measurement report carrying timing difference indication information;

wherein the first determination module 110 includes:

a third determination sub-module 111 configured to determine the timing difference according to the timing difference indication information.

In an embodiment, the receiving module 130 includes:

a receiving sub-module 131 configured to receive the measurement report carrying the timing difference indication information in a measurement result MeasResults information element.

In an embodiment, the apparatus further includes:

a processing module 140 configured to evaluate the CSI-RS measurement result of the UE according to the determined measurement precision parameter.

In an embodiment, the processing module 140 includes:

a processing sub-module 141 configured to evaluate the CSI-RS measurement result carried in the MeasResults information element of the received measurement report according to the determined measurement precision parameter.

In an embodiment, the CSI-RS measurement result includes: a CSI-RS measurement result of the synchronous reference cell and/or a CSI-RS measurement result of the neighboring cell.

Embodiments of the present disclosure further provide an information transmission apparatus, applied to a user equipment UE. As shown in FIG. 4, the apparatus 200 includes: a sending module 210, wherein the sending module 210 is configured to send a measurement report carrying timing difference indication information, wherein the timing difference indication information is used to indicate a timing difference between synchronization timing of a synchronization reference cell and synchronization timing of a neighboring cell in response to that the UE performs channel state information reference signal (CSI-RS) measurement, such that a receiving end determines a measurement precision requirement parameter corresponding to a CSI-RS measurement result obtained by the UE performing the CSI-RS measurement according to the timing difference.

In an embodiment, the sending module 210 includes:

a sending sub-module 211 configured to send the measurement report carrying the timing difference indication information in a measurement result MeasResults information element.

In an embodiment, the MeasResults information element further carries a CSI-RS measurement result obtained by the UE performing the CSI-RS measurement.

In an embodiment, the CSI-RS measurement result includes: a CSI-RS measurement result of the synchronous reference cell and/or a CSI-RS measurement result of the neighboring cell.

In example embodiments, the first determination module 110, the second determination module 120, the receiving module 130, the processing module 140 and the sending module 210, etc. may be implemented by one or more central processing units (CPU), graphics processing units (GPU), baseband processors (BP), application specific integrated circuits (ASIC), DSPs, programmable logic devices (PLD), complex programmable logic devices (CPLD), Field-Programmable Gate Arrays (FPGA), general purpose processors, controllers, Micro Controller Units (MCU), microprocessors, or other electronic elements, to perform the foregoing method.

According to the measurement data processing method and apparatus, the communication device, and the storage medium provided in embodiments of the present disclosure, a base station determines a timing difference between synchronization timing of a synchronization reference cell and synchronization timing of a neighboring cell when a user equipment (UE) performs channel state information reference signal (CSI-RS) measurement; and according to the timing difference, a measurement precision requirement parameter corresponding to a CSI-RS measurement result obtained by the UE performing the CSI-RS measurement is determined. In this way, the measurement precision requirement parameter corresponding to the timing difference is determined, and different measurement precision requirement parameters can be determined for different timing differences. On the one hand, this increases the flexibility in the selection of the measurement precision requirement parameters. On the other hand, the measurement precision requirement parameter corresponding to the timing difference can be used for evaluation when evaluating the measurement results, which improves the evaluation accuracy of the CSI-RS measurement results and thus improves the reliability of the CSI-RS measurement results.

Figure 6:
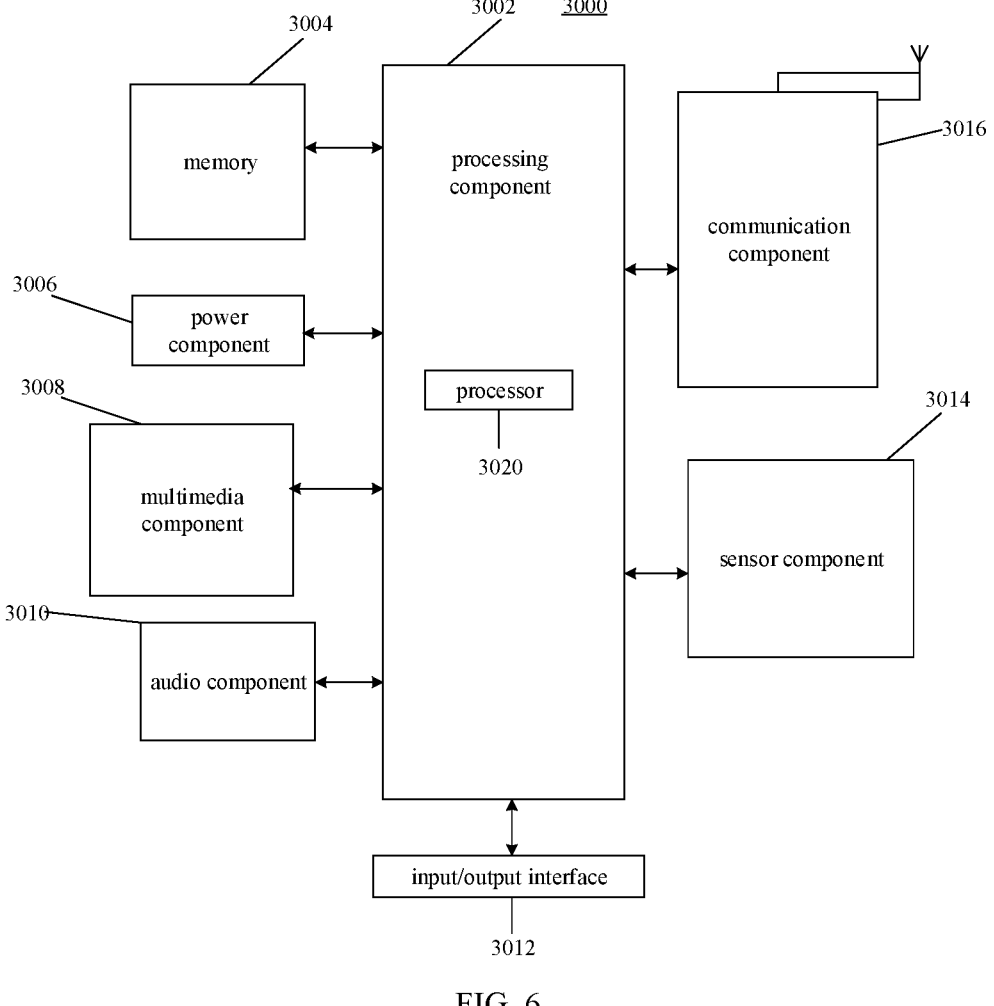
FIG. 6 is a block diagram of a measurement data processing or information transmission apparatus according to an example embodiment.

FIG. 6 is a block diagram of a measurement data processing or information transmission apparatus 3000 according to an example embodiment. For example, the apparatus 3000 may be a mobile phone, a computer, a digital broadcasting terminal, a messaging device, a gaming console, a tablet device, a medical device, a fitness device, a personal digital assistant, etc.

Referring to FIG. 6, the apparatus 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls the overall operations of the apparatus 3000, such as the operations associated with display, telephone calls, data communications, camera operations, and recording operations. The processing component 3002 can include one or more processors 3020 to execute instructions to perform all or part of the steps in the above methods. Moreover, the processing component 3002 can include one or more modules to facilitate the interaction between the processing component 3002 and other components. For example, the processing component 3002 can include a multimedia module to facilitate the interaction between the multimedia component 3008 and the processing component 3002.

The memory 3004 is configured to store various types of data to support the operation of the apparatus 3000. Examples of such data include instructions for any application or method operated on the apparatus 3000, such as the contact data, the phone book data, messages, pictures, videos, and the like. The memory 3004 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3006 provides power to various components of the apparatus 3000. The power component 3006 can include a power management system, one or more power sources, and other components associated with the generation, management, and distribution of power in the apparatus 3000.

The multimedia component 3008 includes a screen providing an output interface between the apparatus 3000 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes and gestures on the touch panel. The touch sensors may not only sense the boundaries of the touch or swipe action, but also detect the duration and pressure associated with the touch or swipe action. In some embodiments, the multimedia component 3008 includes a front camera and/or a rear camera. When the apparatus 3000 is in an operation mode, such as a photographing mode or a video mode, the front camera and/or the rear camera can receive external multimedia data. Each of the front camera and the rear camera may be a fixed optical lens system or have focus and optical zoom capability.

The audio component 3010 is configured to output and/or input an audio signal. For example, the audio component 3010 includes a microphone (MIC) configured to receive an external audio signal when the apparatus 3000 is in an operation mode, such as a call mode, a recording mode, and a voice recognition mode. The received audio signal may be further stored in the memory 3004 or sent via the communication component 3016. In some embodiments, the audio component 3010 also includes a speaker for outputting the audio signal.

The I/O interface 3012 provides an interface between the processing component 3002 and peripheral interface modules, such as a keyboard, a click wheel, buttons, and the like. These buttons may include, but not limited to, a home button, a volume button, a starting button, and a locking button.

The sensor component 3014 includes one or more sensors for providing state assessments of various aspects of the apparatus 3000. For example, the sensor component 3014 can detect an open/closed state of the apparatus 3000, relative positioning of components, such as the display and the keypad of the apparatus 3000. The sensor component 3014 can also detect a change in position of one component of the apparatus 3000 or the apparatus 3000, the presence or absence of user contact with the apparatus 3000, an orientation, or an acceleration/deceleration of the apparatus 3000, and a change in temperature of the apparatus 3000. The sensor component 3014 can also include a proximity sensor configured to detect the presence of nearby objects without any physical contact. The sensor component 3014 can also include a light sensor, such as a CMOS or CCD image sensor, configured to use in imaging applications. In some embodiments, the sensor component 3014 can also include an accelerometer sensor, a gyroscope sensor, a magnetic sensor, a pressure sensor, or a temperature sensor.

The communication component 3016 is configured to facilitate communication between the apparatus 3000 and other devices by wired or wireless manners. The apparatus 3000 can access a wireless network based on a communication standard, such as Wi-Fi, 2G or 3G, or a combination thereof. In an example embodiment, the communication component 3016 receives broadcast signals or broadcast associated information from an external broadcast management system via a broadcast channel. In an example embodiment, the communication component 3016 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an example embodiment, the apparatus 3000 may be implemented with one or more application specific integrated circuits (ASICs), digital signal processors (DSPs), digital signal processing devices (DSPDs), programmable logic devices (PLDs), field programmable Gate arrays (FPGAs), controllers, microcontrollers, microprocessors or other electronic components, to perform the methods described above.

In an example embodiment, there is also provided a non-transitory computer-readable storage medium including instructions, such as a memory 3004 including instructions executable by the processor 3020 of the apparatus 3000 to perform the above methods. For example, the non-transitory computer readable storage medium may be a ROM, a random access memory (RAM), a CD-ROM, a magnetic tape, a floppy disc, and an optical data storage device, or the like.

Other implementations of embodiments of the present disclosure will be apparent to those skilled in the art from consideration of the specification and practice of the present disclosure disclosed herein. The present application is intended to cover any variations, uses, or adaptations of embodiments of the present disclosure, which are in accordance with the general principles of embodiments of the present disclosure and include common general knowledge or conventional technical means in the art that are not disclosed in embodiments of the present disclosure. The specification and embodiments are illustrative only, and the real scope and spirit of embodiments of the present disclosure is defined by the appended claims.

It should be understood that embodiments of the present disclosure is not limited to the precise structures that have been described above and shown in the drawings, and various modifications and changes can be made without departing from the scope thereof. The scope of embodiments of the present disclosure is limited only by the appended claims.

What is claimed is:

1. A measurement data processing method, applied to a base station, the method comprising:
  determining, by a base station, a timing difference between synchronization timing of a synchronization reference cell and synchronization timing of a neighboring cell in response to determining that a user equipment (UE) performs channel state information reference signal (CSI-RS) measurement; and
  determining, by the base station, a measurement precision requirement parameter corresponding to a CSI-RS measurement result obtained by the UE performing the CSI-RS measurement according to the timing difference,
  wherein determining the measurement precision requirement parameter comprises:
  determining that the measurement precision requirement parameter corresponding to the CSI-RS measurement result is a first measurement precision requirement parameter in a case that the timing difference is greater than a timing difference threshold; and
  determining that the measurement precision requirement parameter corresponding to the CSI-RS measurement result is a second measurement precision requirement parameter in a case that the timing difference is smaller than or equal to the timing difference threshold,
  the method further comprising:
  receiving, by the base station, the CSI-RS measurement result from the UE, wherein the CSI-RS measurement result comprises at least one of a reference signal receiving power (RSRP) or a reference signal receiving quality (RSRQ); and
  evaluating, by the base station, the CSI-RS measurement result of the UE according to the measurement precision requirement parameter,
  wherein evaluating the CSI-RS measurement result of the UE comprises:
  in the case that the timing difference is greater than the timing difference threshold, the at least one of the RSRP or the RSRQ does not meet the second measurement precision requirement parameter.

2. The method according to claim 1, further comprising:
  receiving a measurement report carrying timing difference indication information; and
  wherein determining the timing difference between synchronization timing of a synchronization reference cell and synchronization timing of a neighboring cell in response to determining that the UE performs the CSI-RS measurement comprises:
  determining the timing difference according to the timing difference indication information.

3. The method according to claim 2, wherein receiving the measurement report carrying the timing difference indication information comprises:
  receiving the measurement report carrying the timing difference indication information in a measurement results (MeasResults) information element.

4. The method according to claim 1, wherein evaluating the CSI-RS measurement result of the UE according to the measurement precision requirement parameter comprises:
  evaluating the CSI-RS measurement result carried in the MeasResults information element of a measurement report according to the measurement precision requirement parameter.

5. The method according to claim 1, wherein the CSI-RS measurement result comprises at least one of following results: a CSI-RS measurement result of the synchronization reference cell or a CSI-RS measurement result of the neighboring cell.

6. An information transmission method, comprising:
  sending, by a user equipment (UE), a measurement report carrying timing difference indication information, wherein the timing difference indication information is used to indicate a timing difference between synchronization timing of a synchronization reference cell and synchronization timing of a neighboring cell in response to determining that the UE performs channel state information reference signal (CSI-RS) measurement;
  determining, by a base station, a measurement precision requirement parameter corresponding to a CSI-RS measurement result obtained by the UE performing the CSI-RS measurement according to the timing difference; and
  evaluating, by the base station, the CSI-RS measurement result of the UE according to the measurement precision requirement parameter,
  wherein the timing difference being greater than a timing difference threshold is used to indicate that the measurement precision requirement parameter corresponding to a CSI-RS measurement result obtained by the UE performing the CSI-RS measurement is a first measurement precision requirement parameter; and
  the timing difference being smaller than or equal to the timing difference threshold is used to indicate that the measurement precision requirement parameter corresponding to the CSI-RS measurement result is a second measurement precision requirement parameter;
  the method further comprising:
  sending, by the UE, the CSI-RS measurement result, wherein the CSI-RS measurement result comprises at least one of a reference signal receiving power (RSRP) or a reference signal receiving quality (RSRQ),
  in the case that the timing difference is greater than the timing difference threshold, the at least one of the RSRP or the RSRQ does not meet the second measurement precision requirement parameter.

7. The method according to claim 6, wherein sending the measurement report carrying the timing difference indication information comprises:

sending the measurement report carrying the timing difference indication information in a measurement results (MeasResults) information element.

8. The method according to claim 7, wherein the MeasResults information element further carries the CSI-RS measurement result obtained by the UE performing the CSI-RS measurement.

9. The method according to claim 8, wherein the CSI-RS measurement result comprises at least one of following results: a CSI-RS measurement result of the synchronization reference cell or a CSI-RS measurement result of the neighboring cell.

10. A measurement data processing apparatus, applied to a base station, the apparatus comprising a processor, a memory and an executable program stored on the memory and capable of being run by the processor, wherein, when running the executable program, the processor is configured to:

determine a timing difference between synchronization timing of a synchronization reference cell and synchronization timing of a neighboring cell in response to determining that a user equipment (UE) performs channel state information reference signal (CSI-RS) measurement; and determine a measurement precision requirement parameter corresponding to a CSI-RS measurement result obtained by the UE performing the CSI-RS measurement according to the timing difference, wherein the processor is further configured to:

determine that the measurement precision requirement parameter corresponding to the CSI-RS measurement result is a first measurement precision requirement parameter in a case that the timing difference is greater than a timing difference threshold; and determine that the measurement precision requirement parameter corresponding to the CSI-RS measurement result is a second measurement precision requirement parameter in a case that the timing difference is smaller than or equal to the timing difference threshold, the processor is further configured to:

receive the CSI-RS measurement result from the UE, wherein the CSI-RS measurement result comprises at least one of a reference signal receiving power (RSRP) or a reference signal receiving quality (RSRQ); and evaluate the CSI-RS measurement result of the UE according to the measurement precision requirement parameter, wherein evaluating the CSI-RS measurement result of the UE comprises:

in the case that the timing difference is greater than the timing difference threshold, the at least one of the RSRP or the RSRQ does not meet the second measurement precision requirement parameter.

11. The apparatus according to claim 10, wherein the processor is further configured to:

receive a measurement report carrying timing difference indication information; and determine the timing difference according to the timing difference indication information.

12. The apparatus according to claim 11, wherein the processor is further configured to:

receive the measurement report carrying the timing difference indication information in a measurement results (MeasResults) information element.

13. The apparatus according to claim 10, wherein the processor is further configured to:

evaluate the CSI-RS measurement result carried in the MeasResults information element of a received measurement report according to the measurement precision requirement parameter.

14. An information transmission apparatus, applied to a user equipment (UE), the apparatus comprising a processor, a memory and an executable program stored on the memory and capable of being run by the processor, wherein, when running the executable program, the processor performs the information transmission method according to claim 6 when executing the executable program.

15. A non-transitory storage medium, with an executable program stored thereon, wherein the executable program implements the measurement data processing method according to claim 1 when executed by a processor.

16. A non-transitory storage medium, with an executable program stored thereon, wherein the executable program implements the information transmission method according to claim 6 when executed by a processor.

* * * * *